United States Patent [19]

Walko et al.

[11] Patent Number: 5,149,142
[45] Date of Patent: Sep. 22, 1992

[54] VENT COLLAR FOR PLASTIC LINED PIPE

[75] Inventors: Lee E. Walko, Midland; Rodney G. Grusecki, Omer, both of Mich.

[73] Assignee: The Dow Chemical Company, Midland, Mich.

[21] Appl. No.: 251,264

[22] Filed: Sep. 30, 1988

[51] Int. Cl.$^5$ ............................................. A16L 55/00
[52] U.S. Cl. ........................................ 285/14; 285/55; 285/363
[58] Field of Search .................. 285/55, 13, 14, 363; 138/DIG. 6, 114, 109, 140, 148

[56] References Cited

U.S. PATENT DOCUMENTS

| | | | |
|---|---|---|---|
| 2,688,500 | 9/1954 | Scott | 285/13 |
| 3,089,713 | 5/1963 | Scaramucci | 285/14 |
| 3,301,277 | 1/1967 | Kelly | 138/114 |
| 3,506,039 | 4/1970 | Marriott | 138/114 |
| 3,650,550 | 3/1972 | West | 285/55 |
| 3,735,475 | 5/1973 | Marriott | 29/455 |
| 4,127,287 | 11/1978 | Davies | 285/55 |
| 4,281,859 | 8/1981 | Davies | 285/55 |
| 4,537,425 | 8/1985 | Press et al. | 285/55 |
| 4,643,457 | 2/1987 | Press | 285/55 |
| 4,691,740 | 9/1987 | Svetlik et al. | 138/109 |

*Primary Examiner*—Dave W. Arola

[57] ABSTRACT

In a lined pipe, permeated gases trapped between the liner and the outer casing are vented by a collar received between the liner flange and the pipe flange which defines at least one predetermined channel through which the gases may exit.

22 Claims, 3 Drawing Sheets

5,149,142

VENT COLLAR FOR PLASTIC LINED PIPE

BACKGROUND OF THE INVENTION

The present invention pertains to pipe venting systems, and in particular to a venting system specially suited for use in conjunction with plastic lined pipe.

Lined pipe is often utilized in handling of fluid materials having a corrosive nature. Lined pipe generally consists of a rigid outer casing and an inner corrosive resistant lining. Although the synthetic lining materials typically used are highly resistant to corrosion, they are susceptible to permeation by certain gases. Permeated gases then become trapped between the liner and the casing and can, if not properly vented, cause the liner to distort and separate from the casing, and at times cause its complete collapse or rupture.

The most conventional method of venting permeated gases is to drill a series of vent holes in the casing along its length. In order to avoid weakening of the casing, the holes formed are of a relatively small size and few in number. The small diameter holes, however, often become plugged by subsequent sandblasting and painting operations, which in turn frustrate proper venting. To avoid such plugging, the vent holes must be cleaned. Such cleaning is usually performed in the field. In addition, the holes can be covered with insulation and thus require that special vent extender tubes be added to the pipe. The vent extender tubes add extra cost to the pipe system. When field fabrication is required, the holes must be added to the pipe at the site. Such field work greatly increases the labor costs and time of installation, since the fabricator must (before installation) remove the liner, drill and deburr the holes, and then push the liner back into place.

A second manner by which pipe venting has been accomplished is through the use of a locking collar positioned at the juncture of two lined pipes. The collar is not designed for venting, but rather for locking the face of the liner against movement (a phenomenon commonly known as creep). Venting occurs because the metal locking collar and pipe flange face do not form a perfect seal. Although the gases are often able to pass through some tortuous path at the interface, this system is fraught with uncertainty since each interface will be substantially different and the very small paths are susceptible to plugging and thus fouling of the venting.

Further, with the use of either of the past venting systems, failure of the lining can cause an extremely hazardous and troublesome situation. More particularly, the paths through which venting occurs are random, unpredictable and completely open to the surrounding environment. Failure of the lining could, then, cause severe leakage into the surrounding environment and thereby create a health hazard, a danger to surrounding equipment and/or a situation involving a very labor-intensive and costly clean-up.

In an effort to control the venting of permeated gases, specially designed pipe casings and flanges have been developed which centralize the venting openings to facilitate containment thereof. An example of such a construction is disclosed in U.S. Pat. No. 3,506,039 issued Apr. 14, 1970 to Marriott, and entitled VENTING OF LINED PIPE. However, special machining of the pipe segments and flanges greatly increases the cost involved in manufacture.

SUMMARY OF THE INVENTION

In accordance with the present invention, a unique venting system is provided which effects not only efficient, economical and sure venting of permeated gases, but also enables easy containment of fluid leakage should rupture of the lining occur. Venting collars are the heart of the present invention and include an annular disk positioned between the flange portion of the liner and the pipe flange of the casing at the juncture of each pair of abutting pipe segments. The disk possesses a non-planar configuration which defines distinct passages through which permeated gases may pass to exit the lined pipe.

By using the vent collars of the present invention, an economical and efficient venting arrangement may be incorporated into a lined piping system in an easy assembly operation. Due to the control of the venting only through specifically defined passages located only at the junctures of adjacent pipe, the vented gases may be easily collected and monitored. Also, any leakage caused by rupture of the lining may be effectively contained from spilling into the surrounding environment. Moreover, the vent collars require little, if any, special machining of the pipes for incorporation into the system which not only greatly reduces the cost of the system, but also facilitates a more universal usage of the vent collars.

These and other objects, advantages and features of the present invention will be more fully understood and appreciated by reference to the written specification and appended drawings.

DETAILED DESCRIPTION OF THE PREFERRED EMBODIMENTS

Lined Pipe Generally

Figure 1:
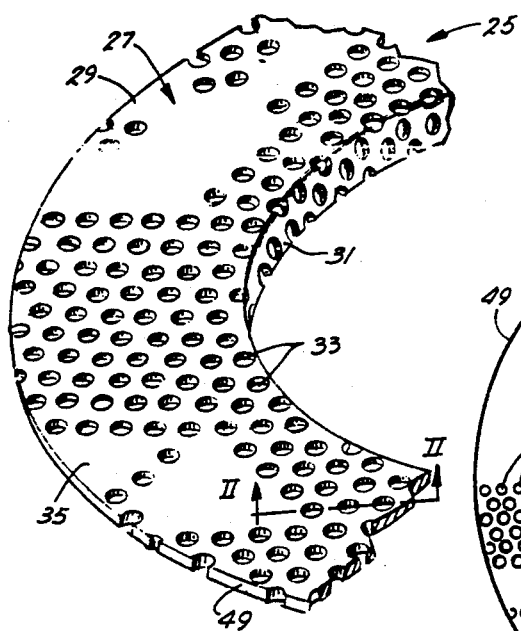
FIG. 1 is a fragmentary, perspective view of a first embodiment of a vent collar of the present invention.

Lined pipe segments 12 (FIG. 4) are defined by an outer rigid casing or shell 14 and an inner corrosive resistant liner 16. Casing 14 is composed of a structurally strong material, such as steel; although a great many other materials possessing the required strength could be used. Liner 16 is preferably composed of a plastic material, such as polytetrafluoroethylene. Of course, many other materials having sufficient corrosion resistance could be utilized depending upon the specific fluid being conveyed therethrough.

A pipe flange 18 is fixedly secured at the end of each segment 12, in order to facilitate interconnection of segments. Pipe flange 18 circumscribes casing 14 and is fixedly connected to the exterior surface 15 thereof via welding or other known means. To ensure a proper sealing of liners 16 at the interconnection of pipe segments 12, a liner flange 20 is provided to flare outward and overlap a portion of a corresponding pipe flange 18. Generally, pipe flange 18 will project radially beyond liner flange 20, and include bores 22 adapted to receive bolts (not shown) to effect the coupling of adjacent pipe segments 12.

First Embodiment

Figure 3:
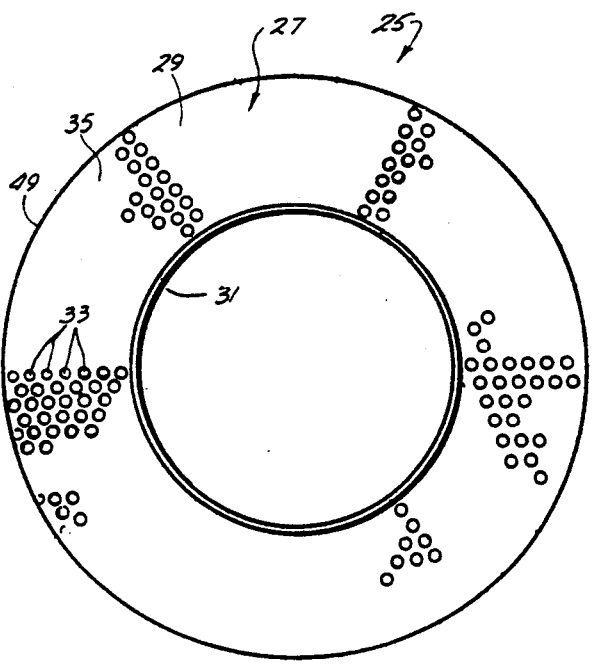
FIG. 3 is an elevational view of the first embodiment of the vent collar.
Figure 4:
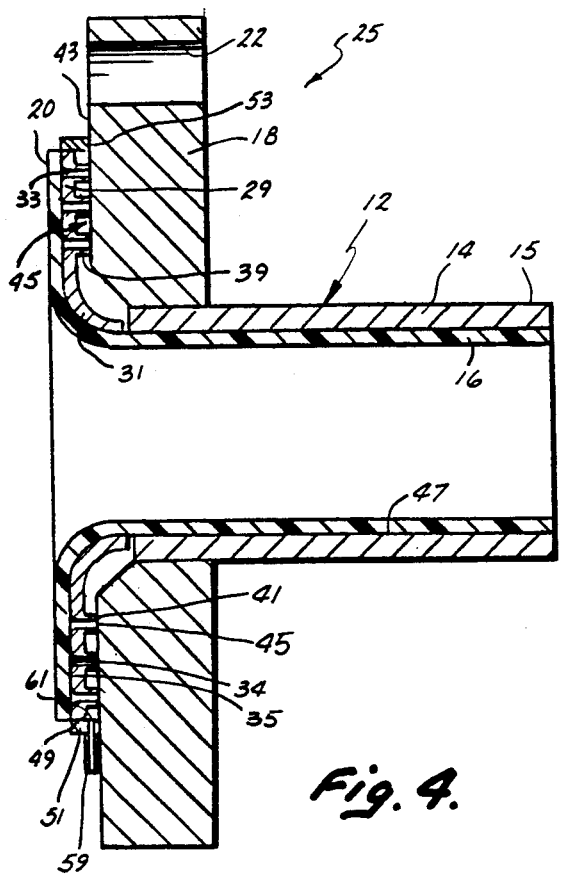
FIG. 4 is a cross-sectional view of a pipe segment utilizing the first embodiment of the vent collar.
Figure 5:
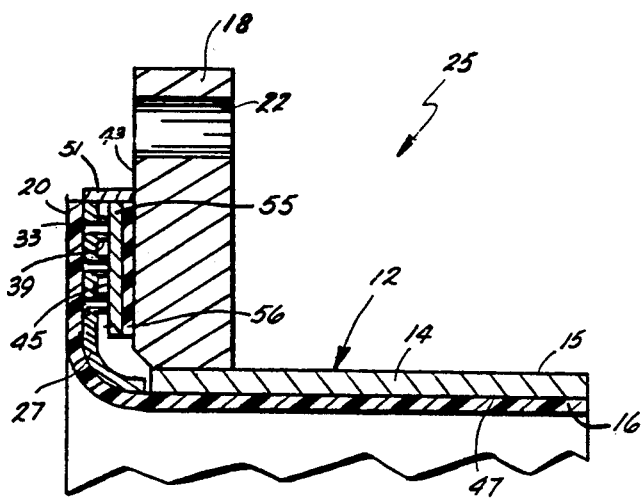
FIG. 5 is a fragmentary, cross-sectional view of an alternative pipe segment utilizing the first embodiment of the vent collar.

In a first embodiment 25 (FIGS. 1-7), a locking vent collar 27 (FIGS. 1-3) having an annular configuration is positioned between liner flange 20 and pipe flange 18 (FIGS. 4 and 5). Locking vent collar 27 is preferably composed of a non-corrosive metallic material such as stainless steel or includes a non-corrosive covering such as nickel plating. Of course, other materials possessing the requisite strength and corrosion resistant characteristics may be used. Locking vent collar 27 includes a planar, radially extending disk portion 29 which extends substantially parallel to pipe and liner flanges 18, 20, and a mounting portion 31 spaced radially inward of disk portion 29 and oriented generally orthogonally thereto. Mounting portion 31 is preferably dimensioned to matingly circumscribe liner 16 and be directed to extend inwardly toward the center of segment 12.

Locking vent collar 27 further includes a plurality of relatively small holes 33 positioned in a pattern thereabout. Holes 33 are utilized to alleviate any subsequent movement of liner 16 during assembly and use. More specifically, when the coupling bolts received through bores 22 are tightened so that the pipe flanges 18 of adjacent pipe segments 12 are drawn together, the inner face 34 of liner flange 20 is positioned flush against the outer face 35 of disk portion 29. As the bolts are tightened, the liner 16 is partially forced to extrude into the formed holes 33 of collar 27. This cooperative interengagement of liner 16 and collar 27 substantially reduces the inherent tendency of liner 16 to shift out of its proper position.

Figure 2:
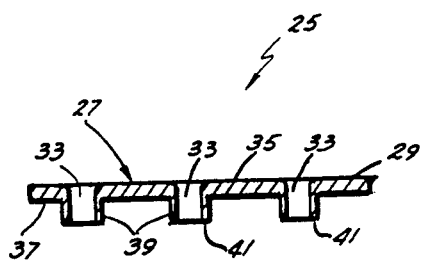
FIG. 2 is a cross-sectional view taken along line II—II in FIG. 1.

Along the opposite inner face 37 of disk portion 29, collar 27 includes a plurality of outwardly projecting ridges 39 (FIGS. 2 and 4). More particularly, each hole 33 is surrounded by an annular ridge 39 projecting toward pipe flange 18 and having a relatively thin diameter. The distal ends 41 of ridges 39 are adapted to engage the abutment face 43 of pipe flange 18 when assembled. This structural arrangement, then, spaces the disk portion 29 of collar 27 slightly from pipe flange 18, such that an intricate channel pattern 45 is formed between locking vent collar 27 and pipe flange 18 (FIG. 4). Preferably, holes 33 and ridges 39 are simultaneously formed by a conventional lancing operation.

The channel pattern 45, defined between ridges 39, forms an effective passage through which the permeated gases trapped between liner 16 and casing 14 may vent. In order to effectuate an efficient venting of such permeated gases, the interior surface 47 of casing 14 may be provided with a groove (not shown) having a helical shape or other pattern. The grooves, then, act as passageways for permitting the permeated gases to pass more easily to the flanged sections for venting as described above. Otherwise, the gases will generally follow a tortuous path thereto.

Figure 7:
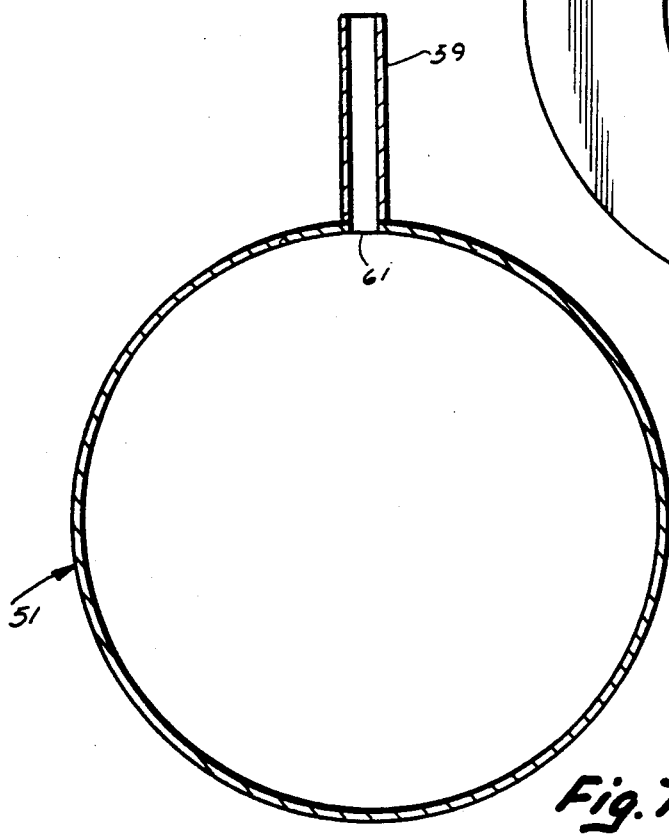
FIG. 7 is an elevational, partially sectional view of the outside ring of the present invention.

In order to control and direct the vented gas, a containment ring 51 is fixedly attached along the outer peripheral edge 49 of locking vent collar 27 (FIGS. 4 and 7). However, containment ring 51 can be eliminated in many environments where specific containment is not needed or desired. Containment ring 51 is preferably a thin, annular, metallic member which projects from plate 27 toward abutment surface 43 of pipe flange 18. Containment ring 51 is dimensioned so that its front end 53 tightly abuts abutment face 43 to thereby form a seal therewith. Additionally, an annular gasket (not shown) ma be positioned between ring 51 and pipe flange 18 to ensure that no leakage of the permeated gases escapes therebetween.

Figure 6:
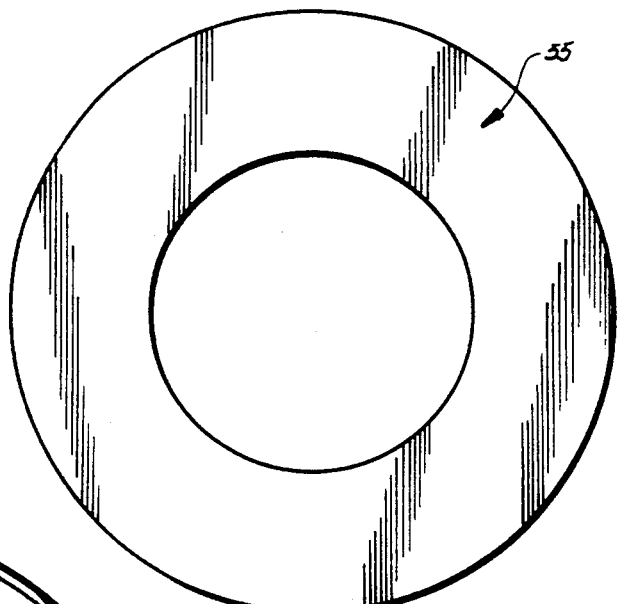
FIG. 6 is an elevational view of the inside plate of the alternative pipe segment.

Also, as an alternative arrangement, an inside plate 55, preferably composed of a metallic material, may be positioned contiguously along abutment face 43 of pipe flange 18 (FIGS. 5 and 6). In this arrangement, locking vent plate 27, containment ring 51 and inside plate 55 may all be fixedly secured together to form a single integral piece or left as individual components and cooperatively positioned during assembly. Furthermore, an annular gasket 56, composed of rubber or other elastomer, may be positioned between inside plate 55 (and optionally the containment ring 51) and pipe flange 18 to again ensure that no unwanted leakage occurs therebetween.

Containment ring 51 is further provided with an escape tube 59 (FIGS. 4, 5 and 7) positioned about an aperture 61 formed in ring 51 and adapted to fluidly couple to conduit (not shown). Escape tube 59 collects the permeated gases in a controlled manner to facilitate monitoring and proper depositing of the gases collected. More specifically, if needed, the gases collected may be routed to a treatment station wherein they are treated, such as by a scrubbing operation, for their elimination. To also aid in the venting of the gases, a negative pressure may be applied to escape tube 59.

Second Embodiment

Figure 9:
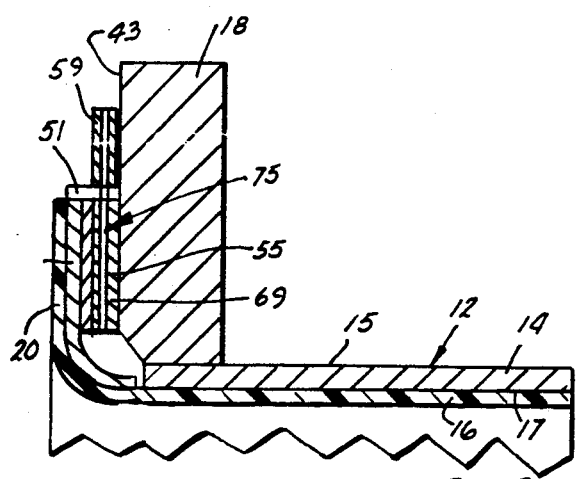
FIG. 9 is a fragmentary, cross-sectional view of a pipe segment utilizing the second embodiment of the vent collar.

In a second embodiment 65 (FIGS. 8 and 9), a locking plate 67, medial plate 68 and wafer plate or collar 69 are utilized in place of the locking vent collar 27.

Figure 8:
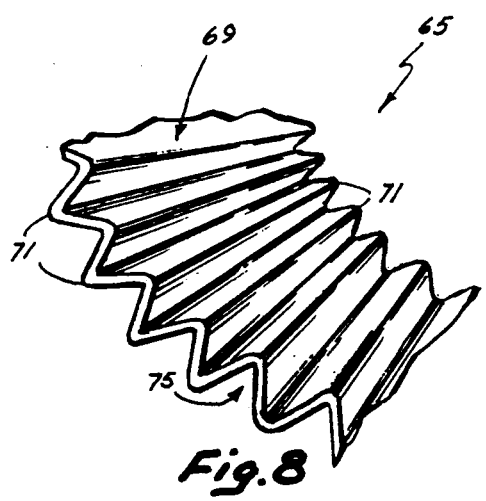
FIG. 8 is a fragmentary, perspective view of a second embodiment of the vent collar of the present invention.

Locking plate 67 is of conventional design and is fabricated with essentially the same shape as locking vent collar 27, with the exception that the ridges 39 are omitted. The annular wafer plate 69, formed to have a non-planar configuration, is positioned between pipe flange 18 and locking plate 67 to define the needed channel pattern to vent the permeated gases. More specifically, wafer plate 69 preferably has a corrugated configuration defined by a series of alternating, laterally offset ridges 71 (FIG. 8). The ridges 71 are substantially radially oriented so that a plurality of radial passages 75 are defined in the corrugation between the ridges, through which the permeated gases may pass. Medial plate 68 is preferably an annular solid disk which is placed between locking plate 67 and collar 69. Medial plate 68 is provided to preclude the undesired extrusion over time of liner 16 through holes 33 and into the radial passages 75 defined by collar 69. Such extrusion, if permitted, could plug passages 75 and thereby foul the intended venting of the permeated gases.

Also, as with the first embodiment 25, an inside plate 55 and gasket 56 (FIGS. 5 and 6) may optionally be utilized between wafer plate 69 and abutment face 43 of pipe flange 18 to decrease the chance of experiencing undesirable leakage. Also, as with first embodiment 25, the components 51, 55, 67, 68, 69 positioned between liner flange 20 and pipe flange 18 may all be fixedly coupled together to form a single integral piece.

Third Embodiment

Figure 10:
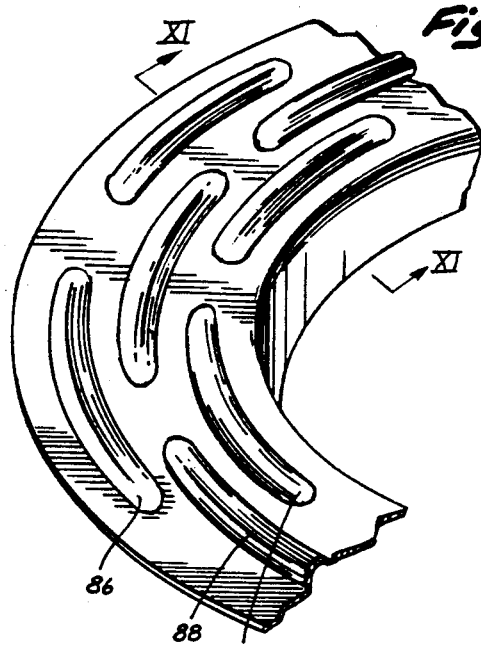
FIG. 10 is a fragmentary, perspective view of a third embodiment of the vent collar.
Figure 11:
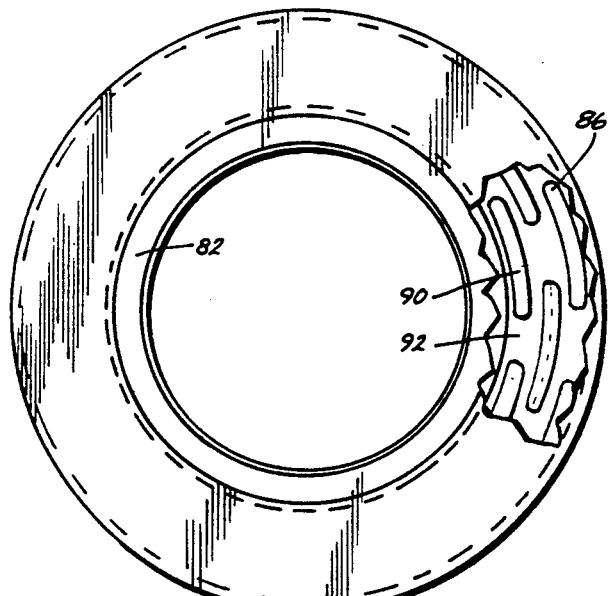
FIG. 11 is an elevational view thereof.
Figure 12:
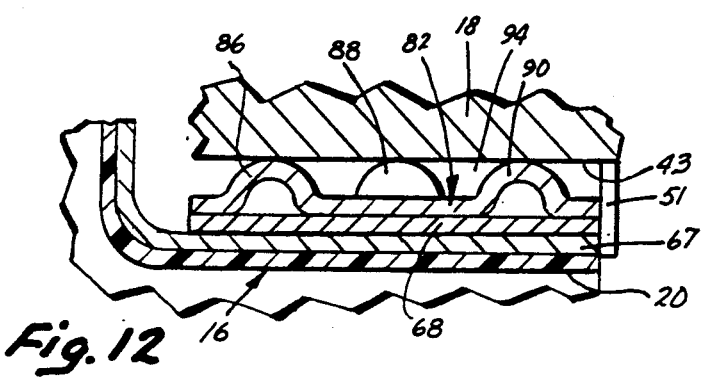
FIG. 12 is a fragmentary, cross-sectional view of a pipe segment employing the third embodiment of the vent collar.

Third embodiment 80 (FIGS. 10-12) is essentially the same as second embodiment 65 with the exception of replacing wafer plate 69 with a venting plate or collar 82 having a different configuration. More specifically, collar 82 is provided a plurality of concentric ridges 86, 88, 90 projecting outwardly toward pipe flange 18 (FIGS. 10 and 11). Ridges 86, 88, 90 include various breaks or openings 92 along their lengths, to thereby permit the radial passage of the permeated gases therethrough. This arrangement then defines circuitous passages 94 through which the gases may vent. Any number of concentric ridges, or even alternatively an irregular pattern of arcuate segments, could be utilized. Again, medial plate 68 is placed between locking plate 67 and collar 82 to prevent the extrusion of liner 16 into the passages defined by ridges 86, 88, 90 and openings 92. Also, as with the previous embodiments, the components 51, 55, 67, 68, 82 positioned between liner flange 20 and pipe flange 18 may all be fixedly coupled together to form a single integral piece.

Of course, other venting collars having a wide variety of shapes could also be utilized. Further, the above descriptions are those of preferred embodiments of the invention. Various other embodiments, as well as many changes and alterations, may be made without departing from the spirit and broader aspects of the invention as defined in the claims.

The embodiments of the invention in which an exclusive property or privilege is claimed are defined as follows.

1. A pipe segment comprising:
a casing having a pair of ends;
a pipe flange fixedly attached to said casing proximate at least one of said ends of said casing;
a liner, received within said casing, having a liner flange extending radially outward and positioned in overlapping relation with said pipe flange; and
a vent collar positioned between said pipe flange and said liner flange, said vent collar having at least one predetermined, defined channel having an inlet opening and an outlet opening spaced radially outward of said inlet opening, whereby permeated gases trapped between said casing and said liner can be vented through said at least one defined channel, said vent collar further including at least one ridge which projects outwardly and offsets said vent collar from said pipe flange to thereby define said at least one channel.

2. A pipe segment comprising:
a casing having a pair of ends;
a pipe flange fixedly attached to said casing proximate at least one of said ends of said casing;
a liner, received within said casing, having a liner flange extending radially outward and positioned in overlapping relation with said pipe flange; and
a vent collar positioned between said pipe flange and said liner flange, said vent collar having at least one predetermined, defined channel having an inlet opening and an outlet opening spaced radially outward of said inlet opening, whereby permeated gases trapped between said casing and said liner can be vented through said at least one defined channel, said vent collar further including a disk portion provided with a plurality of holes and a plurality of ridges; wherein each said hole is substantially surrounded by one of said ridges, whereby said ridges offset said disk portion from said pipe flange to thereby define said at least one channel.

3. The pipe segment of claim 2 further including means for collecting the gases vented through said at least one channel.

4. The pipe segment of claim 3 in which said gas collecting means includes a containment ring positioned radially beyond said outlet opening of said channel defining means, said containment ring further including at least one aperture fluidly coupled to a conduit for collecting the vented gases.

5. The pipe segment of claim 4 further including an inner plate positioned between said vent collar and said pipe flange, wherein said vent collar, said containment ring and said inner plate are all fixedly connected as a single integral piece.

6. The pipe segment of claim 5 further including means for sealing the interface between said inner plate and said pipe flange, whereby the permeated gases are prevented from leaking therethrough.

7. A pipe segment comprising:
a casing having a pair of ends;
a pipe flange fixedly attached to said casing proximate at least one of said ends of said casing;
a liner, received within said casing, having a liner flange extending radially outward and positioned in overlapping relation with said pipe flange; and
a vent collar positioned between said pipe flange and said liner flange, said vent collar having at least one predetermined, defined channel having an inlet opening and an outlet opening spaced radially outward of said inlet opening, whereby permeated gases trapped between said casing and said liner can be vented through said at least one defined channel, said vent collar further including a corrugated structure having alternating, laterally offset ridges oriented substantially radially to define a plurality of channels, including at least one said predetermined defined channel in said corrugated structure between said ridges, whereby the permeated gases trapped between said casing and said liner can be vented.

8. The pipe segment of claim 7 further including means for collecting the gases vented through said at least one channel.

9. The pipe segment of claim 8 in which said gas collecting means includes a containment ring positioned radially beyond said outlet opening of said channel defining means, said containment ring further including at least one aperture fluidly coupled to conduits for collecting the vented gases.

10. The pipe segment of claim 9 further including a locking plate having a plurality of holes for cooperative interengagement between said locking plate and said liner flange whereby movement of said liner flange is alleviated, wherein said corrugated structure is positioned between said locking plate and said pipe flange.

11. The pipe segment of claim 10 further including a medial plate positioned between said locking plate and said corrugated structure for preventing subsequent movement of said liner through said holes in said locking plate and into said defined channels in said corrugated structure.

12. The pipe segment of claim 10 further including an inner plate positioned between said corrugated structure and said pipe flange, wherein said locking plate, said corrugated structure, said inner plate and said containment ring are all fixedly attached as a single, integral piece.

13. The pipe segment of claim 7 further including a locking plate having a plurality of holes for cooperative interengagement between said locking plate and said pipe flange whereby movement of said liner flange is alleviated, wherein said corrugated structure is positioned between said locking plate and said pipe flange.

14. The pipe segment of claim 13 further including a medial plate positioned between said locking plate and said corrugated structure for preventing subsequent movement of said liner through said holes in said locking plate and into said defined channels in said corrugated structure.

15. The pipe segment of claim 13 further including a locking plate having a plurality of holes for cooperative interengagement between said locking plate and said liner flange whereby movement of said liner flange is alleviated, wherein said vent collar is positioned between said locking plate and said pipe flange.

16. The pipe segment of claim 15 further including a medial plate positioned between said locking plate and said corrugated structure for preventing subsequent movement of said liner through said holes in said locking plate and into said at least one defined channel in said vent collar.

17. A pipe segment comprising:
a casing having a pair of ends;
a pipe flange fixedly attached to said casing proximate at least one of said ends of said casing;
a liner, received within said casing, having a liner flange extending radially outward and positioned in overlapping relation with said pipe flange; and
a vent collar positioned between said pipe flange and said liner flange, said vent collar having at least one predetermined, defined channel having an inlet opening and an outlet opening spaced radially outward of said inlet opening, whereby permeated gases trapped between said casing and said liner can be vented through said at least one defined channel, said vent collar further including a disk portion provided with a plurality of substantially concentric ridges, wherein said ridges project outwardly and offset said disk portion from said pipe flange, and wherein each said ridge includes at least one opening therein to permit the radial passage therethrough of the permeated gases and thereby define said at least one channel.

18. The pipe segment of claim 17 further including means for collecting the gases vented through said at least one channel.

19. The pipe segment of claim 18 in which said gas collecting means includes a containment ring positioned radially beyond said outlet opening of said channel defining means, said containment ring further including at least one aperture fluidly coupled to conduits for collecting the vented gases.

20. A flanged pipe system comprising:
a number of lined pipe segments, each of said segments including an outer casing and a liner, at least one end of each segment further including a pipe flange fixedly attached to said casing and a liner flange fixedly connected with said liner and positioned to overlap said pipe flange, and
an annular vent collar received between each said overlapped liner flange and pipe flange, and having means for creating at least one predetermined, defined channel therebetween, whereby permeated gases trapped between the liner and the casing can be vented through said at least one defined channel, said vent collar further including a plurality of holes and a plurality of ridges, wherein each said hole is substantially surrounded by one of said ridges, whereby said ridges offset said vent plate from said pipe flange to thereby define said at least one channel.

21. A flanged pipe system comprising:
a number of lined pipe segments, each of said segments including an outer casing and a liner, at least one end of each segment further including a pipe flange fixedly attached to said casing and a liner flange fixedly connected with said liner and positioned to overlap said pipe flange; and
an annular vent collar received between each said overlapped liner flange and pipe flange, and having means for creating at least one predetermined, defined channel therebetween, whereby permeated gases trapped between the liner and the casing can be vented through said at least one defined channel, said vent collar further including a corrugated structure having alternating, laterally offset ridges oriented substantially radially to define a plurality of channels, including at least one said predetermined, defined channel in said corrugated structure between said ridges, whereby the permeated gases trapped between said casing and said liner can be vented.

22. A flanged pipe system comprising:
a number of lined pipe segments, each of said segments including an outer casing and a liner, at least one end of each segment further including a pipe flange fixedly attached to said casing and a liner flange fixedly connected with said liner and positioned to overlap said pipe flange; and
an annular vent collar received between each said overlapped liner flange and pipe flange, and having means for creating at least one predetermined, defined channel therebetween, whereby permeated gases trapped between the liner and the casing can be vented through said at least one defined channel, said vent collar further including a vent plate having a plurality of substantially concentric ridges, wherein said ridges offset said vent plate from said pipe flange, and wherein each said ridge includes at least one opening therein to permit the radial passage therethrough of the permeated gases and thereby define said at least one channel.

* * * * *

UNITED STATES PATENT AND TRADEMARK OFFICE
CERTIFICATE OF CORRECTION

PATENT NO. : 5,149,142

DATED : September 22, 1992

INVENTOR(S) : Lee Walko, et al.

It is certified that error appears in the above-identified patent and that said Letters Patent is hereby corrected as shown below:

Column 7, line 18, "pipe" should read --liner--.

Signed and Sealed this

Thirtieth Day of November, 1993

Attest:

BRUCE LEHMAN

*Attesting Officer*  *Commissioner of Patents and Trademarks*